(12) United States Patent
Yuan

(10) Patent No.: US 12,297,777 B1
(45) Date of Patent: May 13, 2025

(54) JET ENGINE

(71) Applicant: XinY Structural Consultants, Shanghai (CN)

(72) Inventor: Xin Yuan, Shanghai (CN)

(73) Assignee: XinY Structural Consultants, Shanghai (CN)

( * ) Notice: Subject to any disclaimer, the term of this patent is extended or adjusted under 35 U.S.C. 154(b) by 0 days.

(21) Appl. No.: 18/971,137

(22) Filed: Dec. 6, 2024

Related U.S. Application Data

(63) Continuation of application No. PCT/CN2023/133925, filed on Nov. 24, 2023.

(30) Foreign Application Priority Data

Nov. 9, 2023 (CN) .......................... 202311489141.X

(51) Int. Cl.
| | | |
|---|---|---|
| *F02C 7/00* | (2006.01) | |
| *F01D 5/14* | (2006.01) | |
| *F01D 25/16* | (2006.01) | |
| *F02C 3/06* | (2006.01) | |
| *F02C 7/22* | (2006.01) | |

(52) U.S. Cl.
CPC .............. *F02C 7/222* (2013.01); *F01D 5/141* (2013.01); *F01D 25/16* (2013.01); *F02C 3/06* (2013.01); *F05D 2220/323* (2013.01); *F05D 2240/30* (2013.01); *F05D 2240/35* (2013.01); *F05D 2240/52* (2013.01); *F05D 2240/54* (2013.01); *F05D 2240/61* (2013.01); *F05D 2260/20* (2013.01)

(58) Field of Classification Search
None
See application file for complete search history.

(56) References Cited

U.S. PATENT DOCUMENTS

| | | | | |
|---|---|---|---|---|
| 5,150,569 | A * | 9/1992 | Chapman | F02K 3/00 244/135 R |
| 5,161,369 | A * | 11/1992 | Williams | F02K 3/062 244/135 R |
| 2006/0075754 | A1 | 4/2006 | Champion et al. | |
| 2024/0076049 | A1* | 3/2024 | Binek | F02C 6/20 |

FOREIGN PATENT DOCUMENTS

WO   2013113324   8/2013

* cited by examiner

*Primary Examiner* — Edwin Kang

(57) ABSTRACT

The disclosure relates to a jet engine. The jet engine includes: an engine casing; and a core engine arranged in the engine casing, having a core engine casing, and including a compressor, a turbine, and a combustion chamber arranged between the compressor and the turbine. The compressor is internally provided with a compressor blade, the turbine is internally provided with a turbine blade, radial outer edges of the compressor blade and the turbine blade are connected to the core engine casing, and a space constructed between the engine casing and the core engine casing forms an engine-mounted fuel tank for accommodating fuel.

15 Claims, 4 Drawing Sheets

JET ENGINE

TECHNICAL FIELD

The disclosure relates to a jet engine.

BACKGROUND

A current jet engine mainly consists of a casing and a core engine arranged in the casing. The core engine includes a compressor, a combustion chamber, a turbine, etc. A gas duct is formed between the engine casing and the core engine. Compressor blades are arranged at the outer edge of the compressor. Turbine blades are arranged at the outer edge of the turbine. The outer ends of the blades are free.

For such current jet engine, its thermal efficiency is not very high. For example, the total efficiency of a turbojet engine in flight is typically 20% to 30% since only a small portion of heat released from the combustion chamber is converted into usable work, that is, used to increase kinetic energy of the gas flow, and the remaining portion is dispersed in the atmosphere as useless work along with hot gas. The useless work accounts for about 60% to 75% of chemical energy contained in a fuel. Furthermore, the infrared signature of the hot gas ejected at approximately 600° C. is clearly not conducive to stealth.

In such a jet engine, when the linear velocities of the blades of the compressor, turbine, etc., reach or exceed the speed of sound, the stress levels are high, making blade flutter more likely to occur, thus leading to unstable performance.

On the other hand, such a jet engine has many moving parts, a complex structure, is difficult to maintain, expensive to build, and contains unused space internally.

SUMMARY

An objective of the disclosure is to provide a jet engine capable of solving at least some of the problems mentioned above.

According to an illustrative aspect of the disclosure, a jet engine is provided. The jet engine includes an engine casing, and a core engine. The core engine is arranged in the engine casing, has a core engine casing, and includes a compressor, a turbine, and a combustion chamber arranged between the compressor and the turbine. The compressor is internally provided with a compressor blade, the turbine is internally provided with a turbine blade, radial outer edges of the compressor blade and the turbine blade are connected to the core engine casing, and a space constructed between the engine casing and the core engine casing forms an engine-mounted fuel tank for accommodating fuel.

Features, aspects, and advantages of the disclosure will be better understood with reference to the following description and appended claims.

The accompanying drawings, which are incorporated in the description as a constituent part of the description, illustrate various aspects of the disclosure and serve to explain the principles of the disclosure along with the description.

BRIEF DESCRIPTION OF THE DRAWINGS

The disclosure is further elaborated hereafter in virtue of the accompanying drawings. In the figures.

DETAILED DESCRIPTION

The disclosure will be further elaborated hereafter in conjunction with the accompanying drawings. The following description is illustrative and not intended to limit the disclosure. A person skilled in the art may think of other ways in which the disclosure can be implemented on the basis of preferred embodiments, which also fall within the scope of the disclosure.

Moreover, the terms "first", "second", etc. used in the specification are used only to distinguish various objects for clarity of description, and do not limit the size, number, order, or importance of the objects described.

The terms "front" and "rear" refer to relative positions in a jet engine or transport machine (for example, a vehicle, ship, aircraft, etc.) and are relative to normal operating attitudes of the jet engine or transport machine. For example, for a jet engine, "front" refers to a position closer to an engine inlet, and "rear" refers to a position closer to an engine exhaust outlet.

The terms "upstream" and "downstream" refer to relative directions of fluid flow within the fluid path. For example, "upstream" refers to the direction from which the fluid flows, while "downstream" refers to the direction toward which the fluid flows.

Unless otherwise specified herein, the terms "connect", "fix", etc. refer to direct connection and fixation, as well as indirect connection and fixation through one or more intermediate members or features.

The singular forms "a", "an", and "the" include the plural unless the context clearly requires otherwise.

Figure 1:
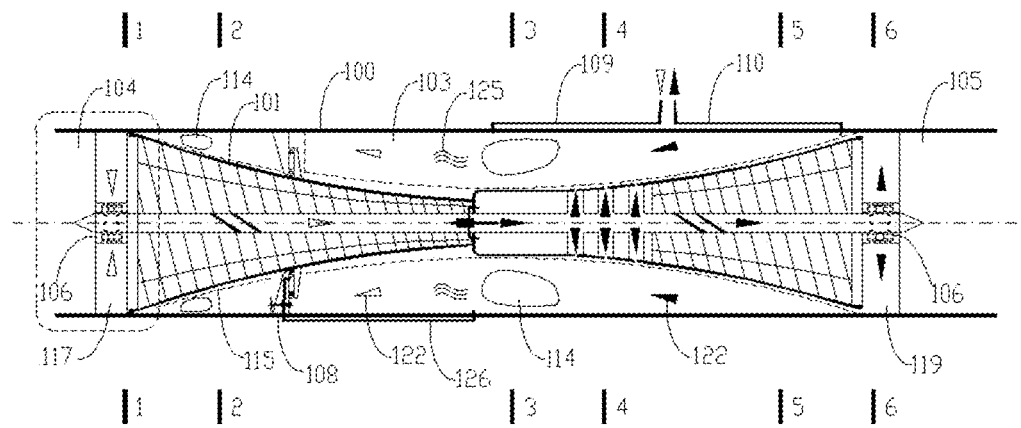
FIG. 1 schematically shows a cross-sectional view of a jet engine according to the disclosure.

FIG. 1 schematically shows a cross-sectional view of a jet engine according to the disclosure. It should be noted that, for simplicity, only the portions relevant to describing the disclosure are shown in FIG. 1 and other drawings, and remaining components of the jet engine, such as the starter for providing the starting power required for the jet engine, check valves for preventing backflow of fuel or combustion gas, an electronic system, a nozzle, etc., are not shown.

As shown in FIG. 1, the jet engine includes an engine casing 100, and a core engine 101 arranged in the engine casing 100.

The engine casing 100 is shown in a form of an elongated cylinder. However, along the longitudinal direction of the jet engine, the engine casing 100 may also have a varying cross-sections. Preferably, the engine casing 100 is of rotationally symmetrical construction.

The core engine 101 has a core engine casing 102, and includes a compressor 111, a turbine 112, and a combustion chamber 113 arranged between the compressor 111 and the turbine 112. The compressor 111 is internally provided with a compressor blade 129. The turbine 112 is internally provided with a turbine blade 130. Herein, a whole constructed by outer peripheral sides of the compressor 111, the combustion chamber 113 and the turbine 112 can be regarded as a core engine casing 102. In other words, casings of the compressor 111, the combustion chamber 113, and the turbine 112 each form part of the core engine casing 102.

Illustratively, the compressor 111, the combustion chamber 113 and the turbine 112 may be provided separately. They are rigidly connected to each other. In this case, the casings of the compressor 111, the combustion chamber 113, and the turbine 112 are sequentially connected to form the core engine casing.

The compressor 111 is configured to increase pressure of the air entering the engine from the inlet 104, so as to provide high-pressure air to the combustion chamber, and to improve efficiency of a thermodynamic cycle of the engine. The compressor 111 shown herein is constructed as an axial-flow compressor, meaning that air flows into and out of the compressor axially. A pressure ratio may be selected according to requirements of the jet engine, and then the compressor can be designed according to the pressure ratio.

Air compressed by the compressor 111 is sent to the downstream combustion chamber 113. The combustion chamber 113 may be composed of an annular cylinder or an annular array of pipes and an ignition nozzle arranged therein. After mixing with fuel (for example, fuel oil) in the combustion chamber, the air is ignited by through the ignition nozzle, and expands rapidly, and then generated hot gases that rush downstream at an extremely high speed.

The hot gas produced in the combustion chamber reaches the turbine. The turbine can spin quickly after gaining energy required for rotation from the hot, high-speed gas flow. Since the turbine, the combustion chamber and the compressor are rigidly connected, the turbine drives the compressor to rotate while the turbine rotates. The high-pressure gas is discharged backwards at a high speed through an exhaust nozzle of the jet engine after passing through the turbine. A reaction force generated thereby becomes a forward thrust to propel the transport machine equipped with the jet engine forward.

Figure 3:
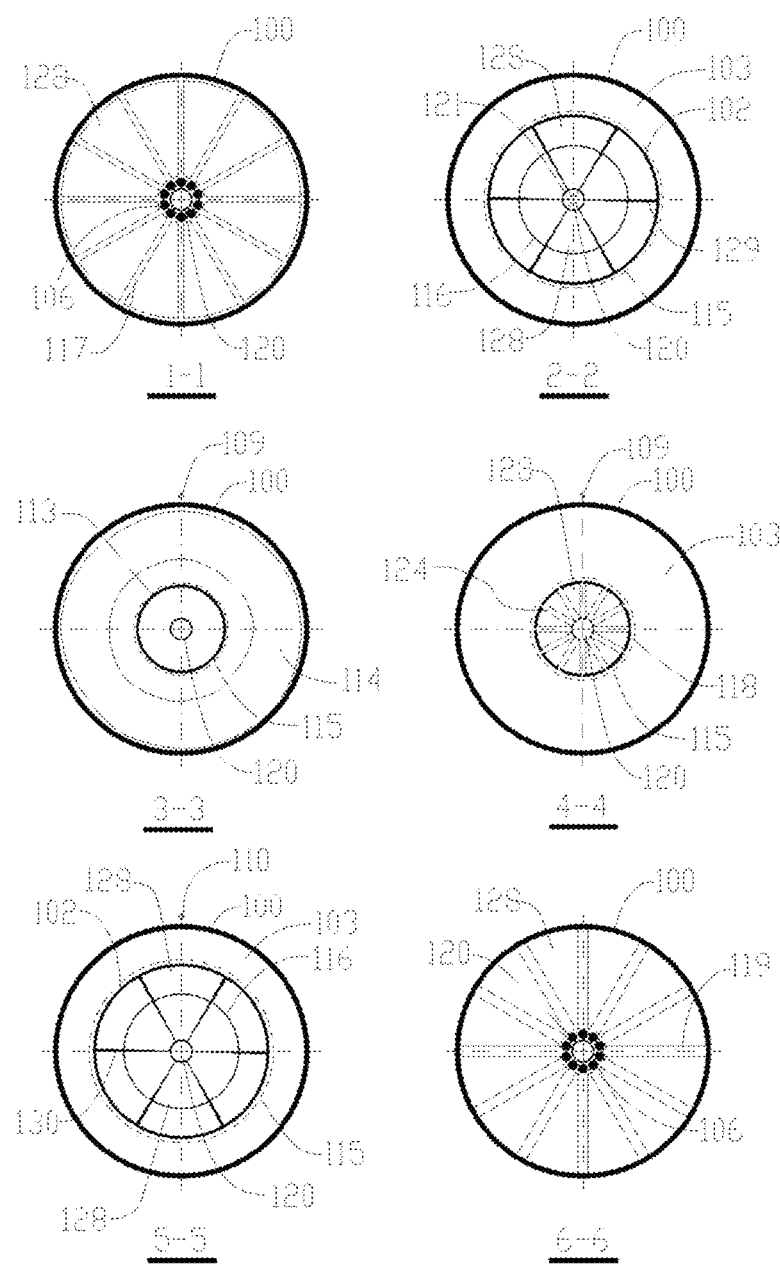
FIG. 3 schematically shows a corresponding cross-sectional view of the jet engine cut along a line shown in FIG. 1.

To accommodate the core engine 101 in the engine casing 100, front support 117 and rear support 119 are arranged inside the engine casing 100. The compressor 111, the combustion chamber 113 and the turbine 112 are rotatably arranged within the engine casing 100 by means of a hollow shaft 120 through bearing 106. The shaft 120 is rotatable relative to the front support 117 and the rear support 119. Air passages 128 for air inflow and combustion gas flow exhaust are formed on the front support 117 upstream and on the rear support 119 downstream respectively. With reference to respective cross-sectional views of the jet engine, cut along lines 1-1 and 6-6 in FIG. 1, shown in FIG. 3, it can be seen that the front support 117 and the rear support 119 are arranged evenly in a circumferential direction in the engine casing 100.

The shaft 120 of the core engine 101 can be understood as a hollow structure extending along the longitudinal direction of the core engine 101, which serves to convey fuel and enables rotation of the core engine 101. The shaft 120 of the core engine 101 may be constructed separately, and alternatively form a part of at least one of the compressor 111, the combustion chamber 113 and the turbine 112. In the former case, the compressor 111, the combustion chamber 113 and the turbine 112 are fixedly mounted on the shaft 120 such that they cannot rotate relative to each other. The compressor 111, the combustion chamber 113 and the turbine 112 are unable to move relative to each other along the axis, for example, they can be rigidly connected to each other. In the latter case, at least a portion of the shaft 120 may be considered to be formed by a central axial passage of at least one of the compressor 111, the combustion chamber 113, or the turbine 112. Although the shaft 120 is shown in the drawings as having a constant cross-section over its entire length, it may also have varying cross-sections at least over some segments as desired.

As can also be seen from FIG. 1, the space constructed between the engine casing 100 and the core engine casing 102 forms an engine-mounted fuel tank 103 for accommodating fuel 125. For this purpose, two ends of the core engine casing 102 are provided with seals 123, in particular non-contact seals, such as labyrinth seals, floating rings, end-face graphite or brush seals, etc., to prevent undesired leakage of fuel contained in the engine-mounted fuel tank 103 from the two ends of the core engine casing 102. In the instance shown in FIG. 7 that is a partial enlarged drawing of FIG. 1, the two ends of the core engine casing 102 extend to the front support 117 and the rear support 119 respectively. Seals, such as labyrinth seals, floating rings, end-face graphite or brush seals, etc., which can extend circumferentially around are arranged between the corresponding ends of the core engine casing 102 and the front support 117 and the rear support 119.

Figure 4:
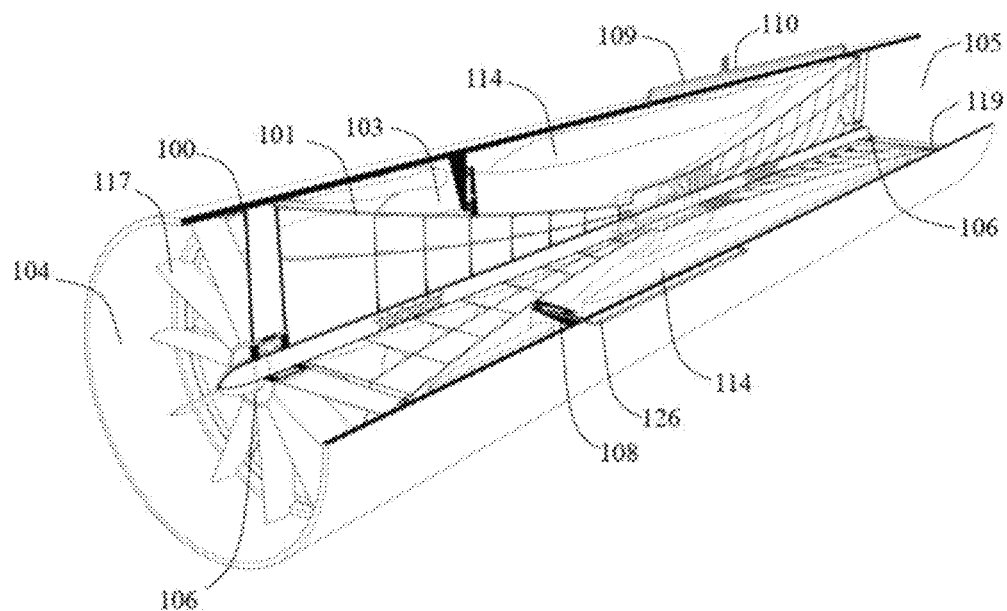
FIG. 4 schematically shows another perspective view in partial sectional view of a jet engine according to the disclosure.
Figure 5:
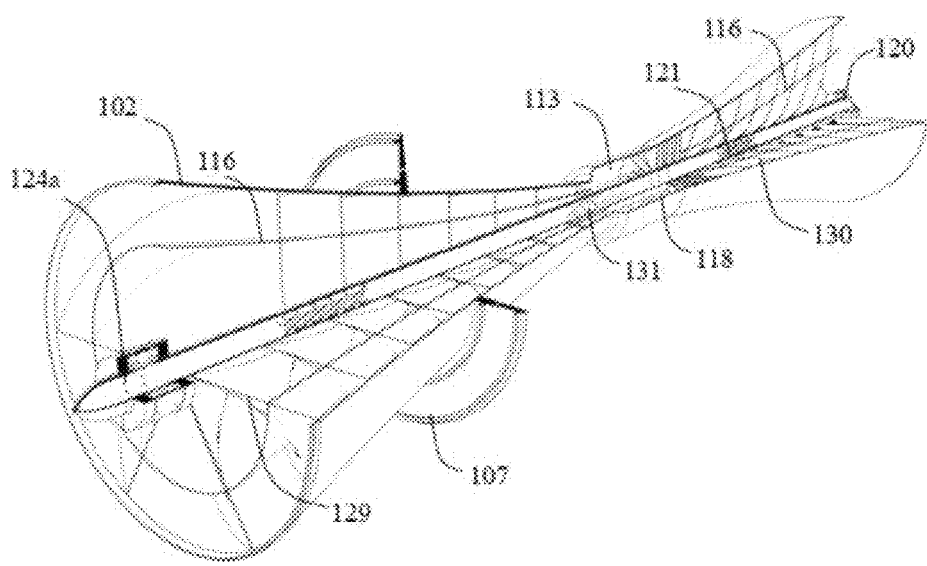
FIG. 5 schematically shows a perspective view in partial sectional view of a core engine of the jet engine in FIG. 4.

At least one expandable fuel compensation bladder 114 may be arranged in the engine-mounted fuel tank 103. The fuel compensation bladder 114 may occupy an unfilled volume of the engine-mounted fuel tank 103 in order to make the best possible use of the fuel in the engine-mounted fuel tank 103. Preferably, the size of the fuel compensation bladder 114 may be automatically adjusted according to the amount of the fuel in the engine-mounted fuel tank 103. FIG. 1 shows by dashed lines 115 a fuel compensation bladder 114 which is inflated to the maximum extent and which occupies almost the entire space of the engine-mounted fuel tank 103. Further, as can be seen particularly from a diagram of a cutaway taken along line 3-3 of FIG. 1 shown in FIG. 3, the expandable fuel compensation bladder 114 may be configured in a ring shape. It is also shown in FIG. 4 that the fuel compensation bladder 114 may also have a given longitudinal length.

In order to convey fuel, that is, fuel from the engine-mounted fuel tank 103 to the combustion chamber 113 in a direction 122 shown in FIG. 1 and, if necessary, fuel that does not flow into the combustion chamber is conveyed back to the engine-mounted fuel tank 103, a fuel conveying channel is constructed in the front support 117, and two ends of the fuel conveying channel communicate with the engine-mounted fuel tank 103 and an internal space of the shaft 120 respectively. A direction of flow of the fuel into and out of the front support 117 is shown by hollow arrows. The fuel conveying channel may be provided in one or more branches of the front support 117 as desired.

In the case that the fuel needs to be conveyed back to the engine-mounted fuel tank 103, a corresponding fuel conveying channel can also be constructed in the rear support 119, and two ends of the fuel conveying channel communicate with the engine-mounted fuel tank 103 and the internal space of the shaft 120. A flow direction of fuel not pumped into the combustion chamber is indicated by solid arrows. The fuel conveying channel described above may be provided in one or more of sub-supports of the rear support 119 as desired.

The shaft 120 is provided with a through hole 124a at a position supported on the front support 117 and provided with a through hole 124c at a position supported on the rear support 119 if appropriate. The fuel can flow into the through holes and, if necessary, out of the internal space of the shaft. Moreover, an internal fuel recirculation unit of the shaft (for example, internal pump blade 121) and/or a pump 131 are arranged in the shaft 120. The internal fuel recirculation unit of the shaft is configured to facilitate circulation of fuel in the shaft 120. The pump 131 is configured to pump fuel, particularly fuel in the shaft 120, into the combustion chamber 113. An output port of the pump 131 may be introduced into the combustion chamber 113. Certainly, the internal fuel recirculation unit of the shaft can also be designed in other suitable ways, for example, as a pump.

Figure 7:
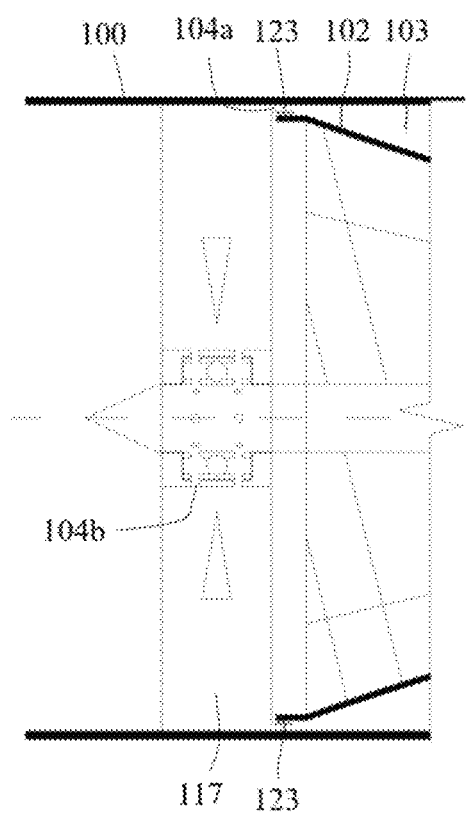
FIG. 7 shows a partial enlarged drawing of the jet engine in FIG. 1.

In the instance shown in FIG. 7, the engine-mounted fuel tank 103, the fuel conveying channel of the front support 117, and the internal space of the shaft 120 communicate with each other. It can be seen that at least one of the branches of the front support 117 is provided radially outwardly with an inlet 104a communicating with the engine-mounted fuel tank 103 and radially inwardly with an outlet 104b communicating with the through hole 124a of the shaft 120. A bearing 106 for the shaft 120 may be arranged radially inward of the front support 117. For this purpose, illustratively, an annular groove having a width greater than that of the bearing 106 can be constructed on a radially inner periphery of the front support 117, and sealing can be performed at a contact portion of the front support 117 with the shaft 120. The through holes 124a of the shaft 120 distributed in a circumferential direction are located on two sides of the bearing 106, and certainly, can be located on either side of the shaft. The bearing 106 can be embodied, for example, as a radial bearing.

The rear support 119 may have a structure similar to that of the front support when provided with a fuel conveying channel accordingly. Specifically, at least one of the branches of the rear support 119 is provided radially outwardly with an outlet communicating with the engine-mounted fuel tank 103 and radially inwardly with an inlet communicating with the through hole 124c of the shaft 120. The bearing 106 for the shaft 120 may be arranged radially inward of the rear support 119. For this purpose, illustratively, an annular groove having a width greater than that of the bearing 106 can be constructed on a radially inner periphery of the rear support 119, and sealing can be performed at a contact portion of the rear support 119 with the shaft 120. The through holes 124c of the shaft 120 distributed in a circumferential direction are located on two sides of the bearing 106, and certainly, can be located on either side of the shaft. Similarly, the bearing 106 can be embodied, for example, as a radial bearing.

Figure 2:
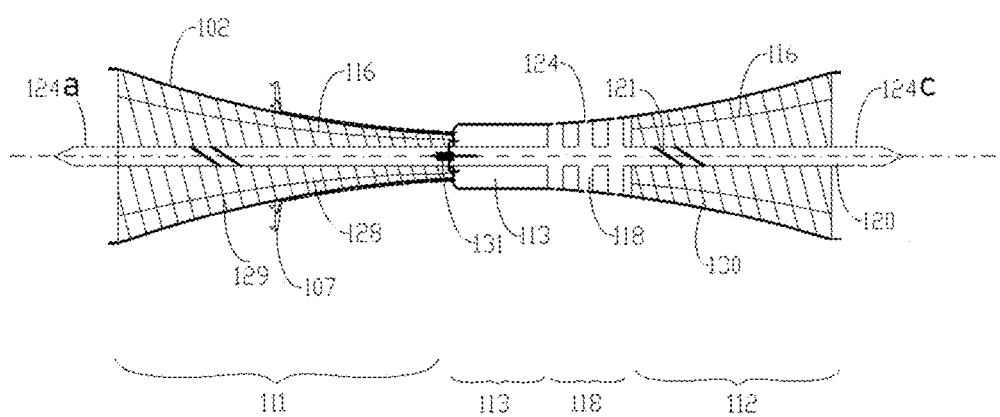
FIG. 2 schematically shows a cross-sectional view of a core engine of the jet engine in FIG. 1.

A schematic diagram of the core engine 101 is shown separately in FIG. 2. In this instance, the compressor 111, the combustion chamber 113 and the turbine 112 are rigidly connected to each other. Thus, outer peripheral sides of the compressor 111, the combustion chamber 113, and the turbine 112 form the core engine casing 102 of the core engine 101. Furthermore, a radial outer edge of the compressor blade 129 of the compressor 111 is connected to the core engine casing 102. A radial outer edge of the turbine blade 130 of the turbine 112 is likewise connected to the core engine casing 102. By means of the configuration, the entire core engine 101 can rotate synchronously, and the core engine has fewer moving parts and a simple and reliable structure, and is easy in maintenance, low in cost and long in service life. Particularly, the radial outer edges of the compressor blade 129 and turbine blade 130 are connected to the core engine casing. The corresponding blades and the core engine casing are mutually constrained supports, such that a stress level in a component is low, stress performance of the entire structure is desirable, and a maximum rotational linear velocity can be operated stably far higher than the speed of sound under low stress.

Figure 6:
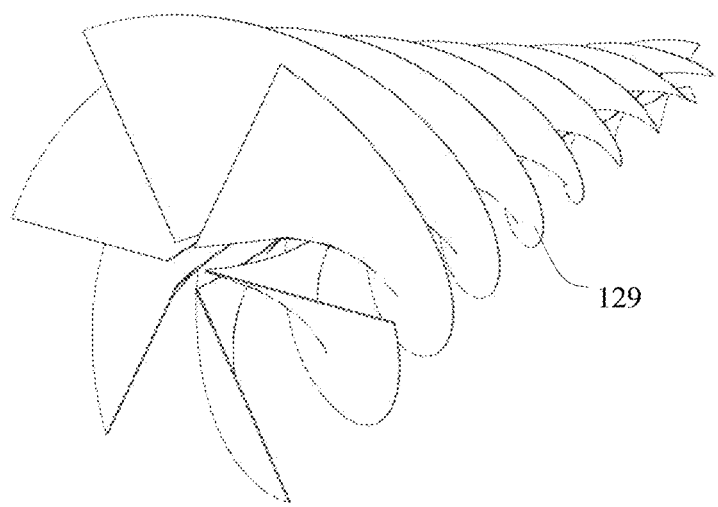
FIG. 6 schematically shows a compressor blade.

In an instance, as can be seen in FIG. 6, the compressor blade 129 and/or turbine blade 130 may be constructed helically. In this case, the number of the compressor blades and the turbine blades can be set as desired. Six blades are illustratively shown in FIG. 6. Certainly, other numbers of blades are possible.

The jet engine is also equipped with a force bearing structure. In the instance shown in FIGS. 1 and 2, the load-bearing structure includes a thrust application ring 107 arranged on the core engine casing 102 and a thrust bearing ring 108 arranged on the engine casing 100. The load-bearing structure is equipped with a hydraulic pipe 126. For example, the hydraulic pipe can be fluidically connected to the engine-mounted fuel tank 103 through a pump that is not shown. As for the load-bearing structure described above, one or more load-bearing structures may be provided in the jet engine according to the disclosure. Alternatively, the load-bearing structure described above may also be achieved by a bearing capable of bearing an axial force. Certainly, the load-bearing structure may also be arranged on the shaft 120.

In an embodiment not shown, the hydraulic pipe 126 assigned to the load-bearing structure can also be connected from the load-bearing structure to a space communicating with the combustion chamber or directly to the combustion chamber. If necessary, fuel in a bottom of the engine-mounted fuel tank and/or in the load-bearing structure can be conveyed by means of the pump through the hydraulic pipe into the combustion chamber, such that a range of a transport machine with the jet engine is maximized.

Additionally, a heat exchanger 118 is constructed between the combustion chamber 113 and the turbine 112. The heat exchanger 118 has a passage 124 communicating the internal space of the shaft 120 and the engine-mounted fuel tank 103. As can be seen from a cross-sectional view cut along line 4-4 of FIG. 1 shown in FIG. 3, a plurality of passages 124 are uniformly distributed in a circumferential direction, and two ends of the passages communicate with the internal space of the shaft 120 and the engine-mounted fuel tank 103 respectively. It should be noted that the position and number of the heat exchanger 118 can be specifically set as desired.

During operation of the jet engine according to the disclosure, a combustion gas flow from the combustion chamber flows downstream to propel the turbine into rotation.

Thus, in the case that the heat exchanger 118 is constructed between the combustion chamber 113 and the turbine 112, a part of the fuel that is from the internal space of the shaft 120 and is not conveyed into the combustion chamber 113 can flow from the shaft 120 into the engine-mounted fuel tank 103 through the passage 124 of the heat exchanger 118. Since the combustion gas flow in the combustion chamber flows through the heat exchanger 118, which allows the fuel flowing through the passage 124 to the engine-mounted fuel tank 103 to exchange heat with the combustion gas flow, such that thermal energy contained in the combustion gas flow is partially recovered. When the combustion gas flow continues to flow downstream, the combustion gas flow sequentially flows through the turbine 112 and the rear support 119, so as to heat the fuel flowing in a center of the turbine 112 and in the fuel conveying channel of the rear support 119, and the thermal energy contained in the combustion gas flow is also partially recovered. Certainly, in the absence of the heat exchanger 118, the combustion gas flow from the combustion chamber may flow directly through the turbine 112 and the rear support 119 in sequence and heat the fuel flowing therein, so as to partially recover the thermal energy contained in the combustion gas flow.

Moreover, since the core engine casing 102 serves to partially define the engine-mounted fuel tank 103, heat exchange may also occur directly between the combustion gas flow at the turbine and the fuel in the core engine casing 102 during flow of the combustion gas flow through the turbine 112, so as to recover the thermal energy contained in the combustion gas flow. Further, heat exchange may also occur between the fuel in the engine-mounted fuel tank and air flowing therethrough, so as to preheat the air before the air participates in combustion, and combustion efficiency is improved.

In view of this, with reference to a direction of flow of air in the jet engine, a cross-section of a casing of the compressor 111 gradually decreases, and a cross-section of a casing of the turbine 112 gradually increases.

In an embodiment, with reference to FIGS. 1-5, a stiffening cylinder 116 may also be arranged in the compressor and/or the turbine of the core engine of the jet engine according to the disclosure. With reference to the direction of flow of air in the jet engine, the stiffening cylinder arranged in the compressor has a gradually smaller section, and the stiffening cylinder arranged in the turbine has a gradually larger section. The stiffening cylinder can be provided with a plurality of physical gas passages subdivided in a radial direction, such that disturbance caused by gas flow interlayer interference is avoided, mechanical performance of an engine structure is improved, and stress and a dead weight are reduced.

Illustratively, longitudinal outer contours of the air passage for air inflow, the engine casing, a compressor casing, an outer periphery of the combustion chamber, a turbine casing, the stiffening cylinder 116, or the air passage for air outflow may extend in a linear manner, a broken line manner, a curvilinear manner, or in any combination thereof.

In an embodiment, the engine-mounted fuel tank 103 is equipped with an extra-engine fuel supply pipe 109 and an extra-engine fuel return pipe 110 that are connected to an extra-engine fuel tank arranged outside the jet engine. Thus, the jet engine according to the disclosure can also be connected to an extra-engine fuel tank, so as to convey fuel to the engine-mounted fuel tank 103 by means of the extra-engine fuel tank or to discharge the fuel from the engine-mounted fuel tank 103. Herein, fuel circulation can also be established between the engine-mounted fuel tank 103 and the extra-engine fuel tank through the extra-engine fuel supply pipe 109 and the extra-engine fuel return pipe 110, that is, the fuel in the engine-mounted fuel tank can flow into the extra-engine fuel tank, and the fuel in the extra-engine fuel tank can also flow into the engine-mounted fuel tank, such that heat exchange can be performed between the two fuel tanks, so as to improve a heat storage capacity of the fuel and improve operation safety of the jet engine.

In an embodiment, if necessary, the engine-mounted fuel tank can directly supply fuel to the combustion chamber.

In an embodiment, an afterburner 105 may be arranged at a downstream position of the turbine 112. Fuel may be combusted in the afterburner, such that thrust per windward area and a thrust-to-weight ratio of the engine can be increased.

In order to operate the jet engine according to the disclosure, fuel can be supplied to the internal space of the shaft 120 by means of the engine-mounted fuel tank 103. The fuel is supplied to the combustion chamber 113 by means of the pump 131, optionally with the assistance of the internal fuel recirculation unit of the shaft. The fuel in the combustion chamber 113 is ignited, and combustion gas in the combustion chamber 113 is led into the turbine 112 to generate thrust.

If necessary, a fuel compensation bladder 114 is arranged in the engine-mounted fuel tank 103. Expansion of the fuel compensation bladder 114 is controlled according to fuel consumption in the combustion chamber 113, such that other cavities is prevented from occurring in the engine-mounted fuel tank 103.

By means of the solution provided in the disclosure, a space formed between the engine casing and the core engine can be used as an engine-mounted fuel tank, such that extra fuel can be carried, which is advantageous for increasing the range. By means of the configuration, the core engine can be considered to be immersed in fuel, buoyancy generated is mathematically continuous and uniform, and the weight of the core engine can be at least partially offset, such that a force on a support structure can be reduced, and a requirement for a corresponding structural strength of the casing is lower. Moreover, the thermal energy can be recovered by heat exchange between gas and fuel, and a jet temperature at a nozzle can be reduced, such that an infrared signature is reduced to improve stealth performance. The heat exchange also raises a temperature of the fuel and air involved in combustion, such that a higher increase in airflow kinetic energy can be obtained with less fuel, which improves thermal efficiency and increases a range.

It should be noted that the features or combinations of the features of the device according to the disclosure described above, as well as the features and combinations of the features mentioned in the accompanying drawings and/or illustrated only in the accompanying drawings, can be used not only in the combinations provided in each case, but also in other combinations or alone, without departing from the scope of the disclosure.

The disclosure has been described by way of the above embodiments, but it should be understood that the above embodiments are for purposes of instances and illustration only and are not intended to limit the disclosure to the scope of the illustrated embodiments. It should be understood by those skilled in the art that many more variations and modifications are possible in light of the teachings of the disclosure, all of which fall within the scope of the disclosure.

The invention claimed is:

1. A jet engine, comprising:
an engine casing; and a core engine, wherein the core engine is arranged in the engine casing, has a core engine casing, and comprises a compressor, a turbine, and a combustion chamber arranged between the compressor and the turbine,
wherein,
the compressor is internally provided with a compressor blade, the turbine is internally provided with a turbine blade, radial outer edges of the compressor blade and the turbine blade are connected to the core engine casing, and a space constructed between the engine casing and the core engine casing forms an engine-mounted fuel tank for accommodating fuel, and
the engine-mounted fuel tank extends from the compressor to the turbine and fully encircles the compressor and the turbine.

2. The jet engine according to claim 1, wherein a front support and a rear support are arranged in the engine casing, the compressor, the combustion chamber and the turbine are rotatably arranged in the engine casing by means of a hollow shaft, and the hollow shaft is rotatable relative to the front support and the rear support.

3. The jet engine according to claim 2, wherein a fuel conveying channel is formed in the front support and the rear support correspondingly, two ends of the fuel conveying channel communicate with the engine-mounted fuel tank and an internal space of the hollow shaft respectively, and the hollow shaft is provided with through holes at portions supported on the front support and the rear support respectively.

4. The jet engine according to claim 3, wherein the hollow shaft is constructed separately or the hollow shaft forms part of at least one of the compressor, the combustion chamber and the turbine.

5. The jet engine according to claim 2, wherein an internal fuel recirculation unit of the hollow shaft and/or a pump are arranged in the hollow shaft, the internal fuel recirculation unit of the hollow shaft is configured to facilitate circulation of the fuel in the hollow shaft, and the pump is configured to pump the fuel into the combustion chamber.

6. The jet engine according to claim 1, provided with a load-bearing structure.

7. The jet engine according to claim 6, wherein the load-bearing structure comprises a thrust application ring arranged on the core engine casing and a thrust bearing ring arranged on the engine casing, and the load-bearing structure is equipped with a hydraulic pipe.

8. The jet engine according to claim 1, wherein the engine-mounted fuel tank is equipped with an extra-engine fuel supply pipe and an extra-engine fuel return pipe that are connected to an extra-engine fuel tank arranged outside the jet engine.

9. The jet engine according to claim 3, wherein a heat exchanger is constructed between the combustion chamber and the turbine, and the heat exchanger has a passage communicating the internal space of the hollow shaft and the engine-mounted fuel tank.

10. The jet engine according to claim 1, wherein the compressor, the combustion chamber and the turbine are rigidly connected to each other.

11. The jet engine according to claim 1, wherein at least one expandable fuel compensation bladder is arranged in the engine-mounted fuel tank.

12. The jet engine according to claim 11, wherein the fuel compensation bladder is constructed in an annular shape.

13. The jet engine according to claim 1, wherein the compressor blade and/or the turbine blade is constructed helically.

14. The jet engine according to claim 1, wherein with reference to a direction of flow of air in the jet engine, a cross-section of the engine-mounted fuel tank adjacent the compressor gradually decreases, and the cross-section of the engine-mounted fuel tank adjacent the turbine gradually increases.

15. The jet engine according to claim 2, wherein two ends of the core engine casing extend to the front support and the rear support respectively, and seals are arranged between a respective end of the two ends of the core engine casing and each of the front support and the rear support.

* * * * *